United States Patent
Grosvenor et al.

(10) Patent No.: US 7,030,909 B2
(45) Date of Patent: Apr. 18, 2006

(54) AUTOMATIC PHOTOGRAPHY

(75) Inventors: David Arthur Grosvenor, Bristol (GB); Stephen Philip Cheatle, Bristol (GB); Andrew Arthur Hunter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 707 days.

(21) Appl. No.: 10/206,939

(22) Filed: Jul. 30, 2002

(65) Prior Publication Data
US 2003/0025798 A1  Feb. 6, 2003

(30) Foreign Application Priority Data
Jul. 31, 2001  (GB) .................... 0118595

(51) Int. Cl.
*H04N 5/225*  (2006.01)
(52) U.S. Cl. .................... 348/207.99; 348/335
(58) Field of Classification Search ............ 348/208.14
See application file for complete search history.

(56) References Cited

U.S. PATENT DOCUMENTS

| | | | |
|---|---|---|---|
| 5,864,363 A * | 1/1999 | Giefing et al. | 348/143 |
| 5,886,739 A * | 3/1999 | Winningstad | 348/158 |
| 6,072,525 A * | 6/2000 | Kaneda | 348/208.15 |
| 6,215,461 B1 * | 4/2001 | Ishibashi et al. | 345/8 |
| 6,404,455 B1 * | 6/2002 | Ito et al. | 348/169 |
| 6,580,448 B1 * | 6/2003 | Stuttler | 348/46 |
| 6,657,673 B1 * | 12/2003 | Ishikawa | 348/376 |
| 6,753,904 B1 * | 6/2004 | Nomura | 348/208.1 |

(Continued)

FOREIGN PATENT DOCUMENTS

EP  0 687 922 A2  12/1995

(Continued)

OTHER PUBLICATIONS

Y. Nakamura et al., "Structuring Personal Experiences—Analyzing Views from a Head-Mounted Camera," IEEE Conference on Multimedia (2000), 2:1137-1140.

(Continued)

*Primary Examiner*—David Ometz
*Assistant Examiner*—Dillon Durnford-Geszvain
(74) *Attorney, Agent, or Firm*—Foley & Lardner LLP

(57) ABSTRACT

Automated camera apparatus comprises a head mounted electronic camera 1 for providing a video signal 3 representative of an image 2 viewed by the wearer, video signal processor 51 arranged to receive said video signal for judging the degree of interest shown by the wearer in a feature in the scene and for providing a related saliency signal 12, the means 51 including image analyser 5 for identifying the presence of features and their locations relative to a reference position (e.g. the center) in the frame within each of a series of frames in a time window of the video signal, and track analysis means 7 coupled to the output of said image analyser for analysing the movement of at least one said feature over said series of frames to provide the saliency signal. As shown saliency signals 8 are provided for each or selected features identified in the scene and are thresholded in circuit 9 to provide binary signals 10, ORed together at 11 to provide a two-level or binary saliency signal 12 which is positive for salient features and zero otherwise. The video signal is delayed 4, and the end (only) of a positive saliency signal 12 is delayed 13 prior to recording 15 of both signals. The signal 12 may be derived in real time or from a video recording. Account may be taken of head and/or eye movement.

49 Claims, 6 Drawing Sheets

U.S. PATENT DOCUMENTS 6,812,835 B1 * 11/2004 Ito et al. .................. 340/541
6,853,809 B1 * 2/2005 Pelletier .................... 396/85
6,928,232 B1 * 8/2005 Hibi et al. .................. 386/46

FOREIGN PATENT DOCUMENTS

| EP | 0 950 984 A2 | 10/1999 |
|---|---|---|
| EP | 1 139 286 A1 | 10/2001 |
| WO | WO 00/70558 | 11/2000 |

OTHER PUBLICATIONS

T. Kawashima et al., "Situation-based Selective Video-Recording System for Memory Aid," IEEE Conference on Image Processing (1996), 3:835-838.

* cited by examiner

AUTOMATIC PHOTOGRAPHY

BACKGROUND

The automation of photography has always been of interest, but has received increasing attention over the past few decades. Automatic exposure control and auto-focus are now standard features on most cameras, and many cameras have other electronically controlled or electrical features. Video and still cameras with electronic image sensors in the form of one or more photosensitive arrays are becoming increasingly available to the public, and are popular since they provide facilities not previously available, including the means to record images cheaply, to select edit and print only those images which are considered acceptable, and to do so at home using only a PC and ancillary equipment, and to transmit and receive images using e-mail.

However, in general, cameras bought off the shelf still require an operator to decide upon the composition of the actual picture to be taken, including decisions as to picture framing (direction and zoom) and timing. While the advent of electronic cameras does provide the ability to record a number of pictures in sequence, or even a video clip, from which a suitable image can then be selected, and while this can be followed by a degree of editing, the operator still has to point the camera in generally the correct direction and to press the operating button at around the correct time.

Since both still and video electronic cameras have sensors capable of providing a sequence (not necessarily regular or continuous) of image signals they will be broadly referred to herein as "electronic cameras". The output thereof will be referred to as a "video signal" irrespective of whether it represents a still or moving image, and whether the video signal is recorded at the camera or elsewhere. References to a picture or image should be read as covering both stills and video sequences.

Camera controls such as autofocus and exposure relate more to the technical side of picture taking. These have little or nothing to do with picture composition, including framing and timing, but there is now increasing interest in this latter aspect and the provision of intelligent still and video cameras which have a facility for picture taking or picture selection where conscious operator input is either further reduced or eliminated altogether.

One possible solution is to store the whole of the video signal from a continuously operated camera and manually to select suitable images of image sequences therefrom at a later period. While this reduces the burden on a camera operator, or avoids the need for a camera operator altogether, not only does this approach require a very large amount of video storage, but if a human operator is later required to inspect the stored image during the selection process it is also very time consuming and thus expensive. Therefore it is highly desirable either to have at least some degree of image selection before storage, or, if the whole signal is stored, to record therewith a further signal indicative of where the most interesting portions of the signal are likely to be found.

Known types of automatic camera apparatus in which a degree of picture composition is effected encompass a broad spectrum. At one end lie forms of equipment in which the conditions for picture taking are strictly predetermined and extremely restricted, for example booths for taking passport photographs where the camera is operated with a fixed timing after a seated customer in an essentially fixed position has put money into the machine.

More freedom is permitted in apparatus where picture taking is automatically triggered in response to a predetermined condition or set of conditions, for example in response to the outcome of an algorithmic computation operating upon the output of one or more sensors. However, one problem with apparatus of this type is in defining the set of conditions necessary for picture taking to be enabled.

In certain circumstances, the prescribed conditions are physically predetermined. Security cameras which commence operation in response to an alarm input, and traffic speed cameras which respond to a vehicle being driven too fast, fall within this category. It is also known to take pictures of visitors on a ride at a theme park by triggering a suitable located fixed camera which is actuated when the car in which the visitor is riding trips a switch, such as by cutting an infra-red beam. Such systems are disclosed in International Patent Application No. WO 98/10358 (Goldberg), European Patent Application No. 0 953 935 (Eastman Kodak), U.S. Pat. No. 5,655,053 (Renie) and U.S. Pat. No. 5,576,838 (Renie) for example.

Other systems allow rather more latitude, by recognition or detection of a feature associated with the feature to be imaged. Thus U.S. Pat. No. 5,844,599 (Hildin) discloses a video camera system for use with a group of people around a conference table, where each person wears a microphone, and the camera is arranged to respond by being directed towards the person who is speaking at the time, and to track the movements of that person. This is a system more intended for viewing than image recordal. European Patent Application No. 0 660 131 (Osen) describes a system where global positioning systems are employed to track a feature, such as an aircraft, so that cameras can be automatically directed thereto.

In this respect, use is increasingly being made of tags for identifying features being imaged/or for triggering the camera. This occurs in U.S. Pat. No. 5,694,514 (Evans) and in International Patent Application No. WO 98/10358 (Goldberg) mentioned above to enable pictures of different features to be easily identified. The latter application describes a number of camera systems including the use of a tag to actuate a camera and to provide data for associating the image with the person wearing the tag; in a variant, facial recognition is used to identify the feature, working from an image and other relevant data initially fed into the system.

However, compared with a personal camera user who can employ a hand-held camera at any time and wherever they are to take pictures of anything considered to be of interest, in all of the prior art mentioned above there remain significant restrictions as to the manner of picture taking. Most known automatic camera apparatus either employs a fixed camera and/or has narrow limitations on the circumstances under which the camera is triggered, e.g. in response to a tag or a conditional or alarm input associated with a restricted condition or set of conditions. In commercial installations such as theme parks, the cameras are essentially fixed and located to capture an image under specific circumstances, for example where it is anticipated that at least some of the stored images will prove to be sufficiently composed and appealing to be of interest to a would-be purchaser.

SUMMARY

It would be desirable to be able to provide a camera which is portable and which can automatically capture different images irrespective of the person's location, as would be the case for a manually operated camera.

It may therefore be considered that a further desirable feature of an automatic camera apparatus is the provision of a signal indicative of when the video signal may relate to an interesting image which is not of a predetermined type. This signal could be used to trigger selective camera operation or selective video signal storage in real time, or it could be used in conjunction with a continuously stored video signal in a later image selection process; if the signal has more than two values, i.e. indicative of the relative likelihood that the video signal relates to an interesting feature, then a combination of these techniques could be adopted, viz. storage of all signals possibly of interest whilst rejecting other signals, and later selection from the stored signals, with initial preference being given to those parts of the signal indicated as being more interesting.

During casual use, as opposed to more formal photography manual camera users need first to identify when a feature of sufficient interest is present to consider taking a picture. That is to say, they will observe their surroundings until such a time as their attention is drawn to a particular feature or image area. In so doing they will move their gaze by moving their head and/or eyes, and the gaze direction can be expected to move in a characteristic manner once there is something interesting to be seen.

It follows that one approach to determining the presence and direction of a feature which is of sufficient interest for picture taking would be to obtain an indication when a person's gaze direction is behaving in such a characteristic manner, and to point the camera accordingly.

Since the camera is being carried, automatically pointing the camera at the feature of interest might be a problem unless it moves with the person's gaze. However, camera sensor technology has now moved to the point where it is possible to secure an entire camera to a person's head with little or no discomfort. A typical mounting for a camera might be within the frame of a pair of spectacles or sunglasses, or (less preferably due to the distance from the eyes) in a hat or other headgear.

The present invention provides automated camera apparatus comprising an electronic camera, the camera comprising a photoelectric sensor optically coupled to imaging optics for providing a video signal representative of an image viewed by the camera, and securing means for securing at least the imaging optics on the head of a wearer with its axis generally parallel to the normal forward line of sight of the wearer, the apparatus further comprising video signal processor arranged to receive said video signal for judging the degree of interest shown by the wearer in a feature in the scene and for providing a related saliency signal, the video signal processing means including an image analyser for identifying the presence of features and their locations relative to a reference position in the frame within each of a series of frames in a time window of the video signal, and track analysis means coupled to the output of said image analyser for analysing the movement of at least one said feature over said series of frames to provide said saliency signal. Preferably the field of view of the camera is at least substantially equal to that of the wearer. The term "feature" as used herein includes, but is not limited to, discrete objects.

Embodiments of the present invention use an electronic camera which is either head mounted or has a head mounting for at least the imaging optics, with means for providing an indication as to how the wearer is looking at features within the environment. Such a system has recently been described by Y Nakamura et al in "Structuring Personal Experiences—Analysing Views from a Head Mounted Camera" in IEEE International Conference on Multimedia & Expo, New York, Electronic Proceedings, where a distinction is made between scenes of "passive attention" (no head/camera motion) and scenes of "active attention" (with head/camera motion). The latter type of scenes are divided into scenes where the target is moving against a relatively fixed background and those where a target is tracked as the head/camera moves, and in either case motion segmentation assessed between a pair of adjacent or spaced frames is used to divide the frame area into target and background areas using a method which requires a determination of depth in the scene. Scenes of passive attention are simply lumped together as a no-motion group.

Subsequently, for the scenes of active attention, the frame area is divided into blocks, a transform is used to synthesise an image of the scene at a time t as would be seen from the next camera position at a time (t+1). A below threshold correlation between pixels of similarly located blocks in the two temporally spaced frames is then used to identify "candidate regions". If they touch each other such regions are merged, the largest resulting candidate region being regarded as the target of attention.

This approach uses optimisation for simultaneous assessment of scene depth, camera motion and other parameters affecting the image viewed by the camera, and accordingly it is believed that it is both computationally intractable and non-robust in all but possibly the very simplest situations.

The final step as described by Nakamura is to generate series of what may be regarded as key or representative frames in response to the foregoing analysis. Scenes of passive attention will alternate with scenes of active attention, the key frames for passive scenes being the first and last frames. It would seem that for active attention, the candidate target area is identified.

Thus it will be understood that the approach adopted by Nakamura, even if possible to perform (see above), is more akin to the analysis of a recorded video signal with a view to providing representative key frames throughout its duration. Although motion of an area is detected in that that its pixels show a degree of correlation between a pair of frames below a threshold level after correction has been made for camera motion, and at least one key frame is generated in response thereto, there is no attempt to identify the manner in which the area is moving relative to the frame area, nor does a determination of the location of that area play any significant part, if at all. This is to be contrasted with the present invention, which can (a) employ target detection by analysis of a single frame if desired; and/or (b) track a target location over a series of frames rather than just investigating the presence or degree of motion of an area, and/or (c) provide a multi-valued saliency signal which runs continuously throughout video signal for recordal therewith or for other purposes such as editing.

Furthermore, unlike Nakamura, the determination of head/camera motion is not a fundamental feature of the present invention in its broadest aspects, so that in the simplest embodiments head/camera motion is not detected. Nevertheless, when desired, head motion may be determined and used in the present invention. Head motion may be determined from the video signal itself, for example by optic flow, by recognising a generally uniform flow pattern associated with a distant background when the camera rotates, but it is possible to employ alternative means, for example sensors such as accelerometers or gyros secured to the head. The latter methods may be found to be preferable in view of the difficulty in dealing with complex optic flow patterns such as occur when a camera is translated, particularly if it is also rotated.

Features (or targets) within a viewed scene may be identified by their appearance, for example by using optical segmentation techniques and/or by using image recognition techniques, both of which can be implemented within single video frames (optic flow requires at least two frames). International Patent Application Publication No. WO 02/052835 and British Patent Application No. 0200213.7, respectively disclose a method for automated cropping of images and a method for selective storage of video images in both of which optical segmentation techniques may be employed to identify areas of possible significance or interest within a video frame. Optic flow techniques applied to a pair of adjacent or spaced frames may be used for this and other purposes.

T Kawashima et al in a paper entitled "Situation-Based Selective Video Recording System for Memory Aid" (0-7803-3258-X/96/$5.00, 1996 IEEE, pages 835–838) discloses a video recording system in which the wearer of a head mounted camera wears other sensors to monitor the environment and the actions of the wearer, the information thus obtained being employed to control the selective recording of the video signal from the camera. As described, the wearer is provided with an ultrasonic sensor for detecting obstacles (features) in front of the wearer, i.e. information about the viewed scene, and accelerometers and gyros are mounted on the shoulders to monitor movements by the wearer. There appears to be no monitoring of the video signal itself for providing control information, nor any monitoring of head direction. By contrast with Kawashima, in the present invention the video signal is used to provide additional (saliency) information.

Within the time window all the frames, or a selected plurality only, e.g. evenly distributed within the window, can be taken into account when determining the saliency signal. If the selected frames (or all the frames from the camera) are unevenly spaced within the window account is preferably taken of the differing time intervals between adjacent frames.

According to the operation of the track analysis means, and the criteria it employs, the saliency signal may have a continuous range of values, or discrete values only. Even where the initial indication is continuous, one or more thresholding levels may be set to provide discrete outputs, and in its simplest and possibly most useful form the saliency signal is a binary signal.

The saliency signal may be derived from the video signal alone, or in conjunction with the outputs from other sensors. If derived in real time, it can be recorded together with the video signal. Alternatively it can be derived from the recorded video signal on a later occasion, in which case the outputs of any other sensors necessary to operation of the apparatus are recorded (synchronously, or with a known time relation) with the video signal.

The saliency signal may be used to indicate to a viewer of a recording where the most interesting portions of the video are to be found, according to its value, whether continuous, discrete or binary.

Alternatively a binary saliency signal derived in real time can be used to control the real time display or recording of a video signal, either directly or following a logical combination with other control inputs. For example, it may be ANDed with a signal detecting occasions when the video signal is of a suitable composition for recording, an example of a system providing the latter type of signal being disclosed for example in our copending British Patent Application No. 0200213.7 mentioned above. Alternatively or additionally it may be ORed with a signal responsive to the presence of a suitably located tag in the viewed scene. It may also be logically or otherwise combined with another saliency signal such as that developed in our copending British Patent Application No. 0123921.9, which relates to the provision of a skull mounted microphone for developing an audio related saliency signal for use in camera control.

It might be expected that accompanying head movement of the camera wearer may provide an additional indication of saliency. For example, a feature of interest may remain generally centred in series of frames whether it is moving or not, but when it is moving it means that the camera wearer has made a positive effort to keep looking towards the feature. Therefore as previously indicated apparatus according to the invention may include head movement sensor for providing a measure of head movement of the wearer, e.g. least one gyro or accelerometer and/or means for analysing the optic flow in said series of frames.

The output of said head movement sensor may be coupled to the camera or the video signal processor effectively to adjust the said reference position. Additionally or alternatively the output of said head movement sensor is coupled to the video signal processor to control the operation of the track analysis means.

Whether or not head movement is measured, an unknown factor is the extent to which the gaze direction of the camera wearer is being altered by eye movement. Thus apparatus of the invention may further comprise an eye direction detector for determining the deflection of the eyes in the head relative to a standard position. The output of said eye direction detector may be coupled to the camera or the video signal processor effectively to adjust said reference position.

While the field of view of the camera may approximate that of the camera wearer, it is preferably greater than the field of view of the wearer, and this can accommodate eye movement of the wearer. For example the apparatus may comprise a scan controller for controlling the scan of the camera, e.g. for scanning a limited area of the photosensor so that the scanned image corresponds generally to what the wearer is seeing when eye movement is taken into account, or possibly a greater area so that features may be tracked to a greater extent. The scan controller may be provided with an adjusting input for ensuring during setting up that the reference position in the video frames substantially coincides with the wearer's normal forward horizontal line of sight.

The scan controller may also or alternatively be provided with a scan control input which is coupled to and responsive to the head movement sensor or the eye direction means mentioned above to perform said effective adjustment of the reference position. This effective adjustment can be performed by adjusting the scanned area of the camera so that the reference position is brought into substantial coincidence with the line of sight of the wearer.

In apparatus according to the invention the image analyser may be adapted to identify features by optical segmentation and/or image recognition.

One pattern of movement of a feature relative to the reference position which can indicate high saliency is for the feature to remain generally at a single location, e.g. centred, within the wearer's field of view, and accordingly the video signal processor may arranged to provide high or positive measure of saliency when a feature remains at or close to a single location in the series of frames.

Another pattern of movement of a feature indicating high saliency might be a series of repeated glances, either to and from the feature, or sweeping through the feature, in each case possibly with a slowing down or cessation of movement as the feature enters a particular region, e.g. central, in the frame. Thus in apparatus according to the invention the video signal processor may be arranged to provide a high or positive measure of saliency when a feature moves relative to the reference location in a manner resembling a series of repeated glances.

The video signal processor of the inventive apparatus may be arranged to function in real time. Such apparatus may include a gate coupled to selectively gate the video signal for display or recordal in response to the saliency signal. It may include means for recording the saliency signal together with the video signal.

In another form of apparatus according to the invention, there are means for recording the video signal together with any other signal necessary for determining the saliency signal, so that the saliency signal can be produced by the video signal processor at a later time.

The analysis of movement of a feature for development of the related saliency signal occurs over a plurality of frames. Therefore, when the saliency signal reaches a value sufficient to indicate that a feature is of interest, that feature may have been in view for some time. When working with recorded signals, it is possible to extend a saliency measure back to the time that the feature first began to become interesting, e.g. to the first frame contributing to the positive identification of an interest. A similar effect may be obtained in real time by providing a video signal delay (which may be fixed or controllable) of an appropriate length. This allows for a video clip to be suitably lengthened, or for the number of available images where saliency is sufficiently high to be increased.

Once a feature has been identified as being sufficiently salient it is also possible to extend the time over which the video signal is regarded as interesting, before and/or after the period of identified high saliency. The time extension may be fixed or controlled (e.g. increased as a value of the saliency measure increases; such a measure could be the maximum saliency measured, or the duration of an above threshold saliency signal). The provision of the time extension may be predetermined, or subject to other conditions, for example whether or not the feature remains in shot.

Thus in one form of embodiment, apparatus according to the invention may be provided with a video signal delay for delaying the video signal relative to the saliency signal, so that the start of the series of frames associated with high saliency is brought closer to the commencement of interest evinced by the wearer. The high saliency portion of the saliency signal may be extended (e.g. by an amount equal to that of the video signal delay) so to prolong the associated series of frames until a time when high saliency has clearly ceased. While these considerations light apply where the saliency signal is continuously varying, they are particularly appropriate where the track analysis means includes a thresholding arrangment for providing a discretely varying saliency signal. In general, in such a case, the apparatus may include a time adjuster for altering the time of the transitions of said discretely varying threshold signal.

The invention extends to a method of deriving a saliency signal which indicates the saliency of a feature to a wearer of an camera providing a video signal wherein at least the imaging optics of the camera are mounted on the wearer's head, the method comprising the steps of feature analysis in which each of a selected series of individual frames of the video signal is analysed to identify at least one feature and the position thereof within the frame, and pattern analysis in which the pattern of movement of the feature(s) within the frames over said series is analysed to derive a said saliency signal corresponding to said at least one feature.

In this method the reference position may be arranged to correspond substantially with the wearer's normal horizontal line of signal.

The method may include the step of obtaining a head movement signal indicative of movement of the head of the camera wearer. The head movement signal can be used to modify the said pattern analysis step and/or to modify the scanning action of the camera.

The method may include the further step of obtaining an eye movement signal indicative of eye movement of the wearer relative to the head. The eye movement signal can used to modify the pattern analysis step and/or to modify the scanning action of the camera.

In the method according to the invention the said pattern analysis step may include classifying the movement of the feature according to a set of predetermined reference patterns and obtaining said saliency signal in a manner related to the classification of said pattern.

The method may be effective to derive the saliency signal in real time, or the video signal could be recorded prior to the obtaining of the saliency signal.

Further details and advantages of the invention will become more apparent upon a consideration of the appended claims to which the reader is referred and upon a reading of the following more particular description, made with reference to the accompanying drawings, in which:

DETAILED DESCRIPTION

Figure 1:
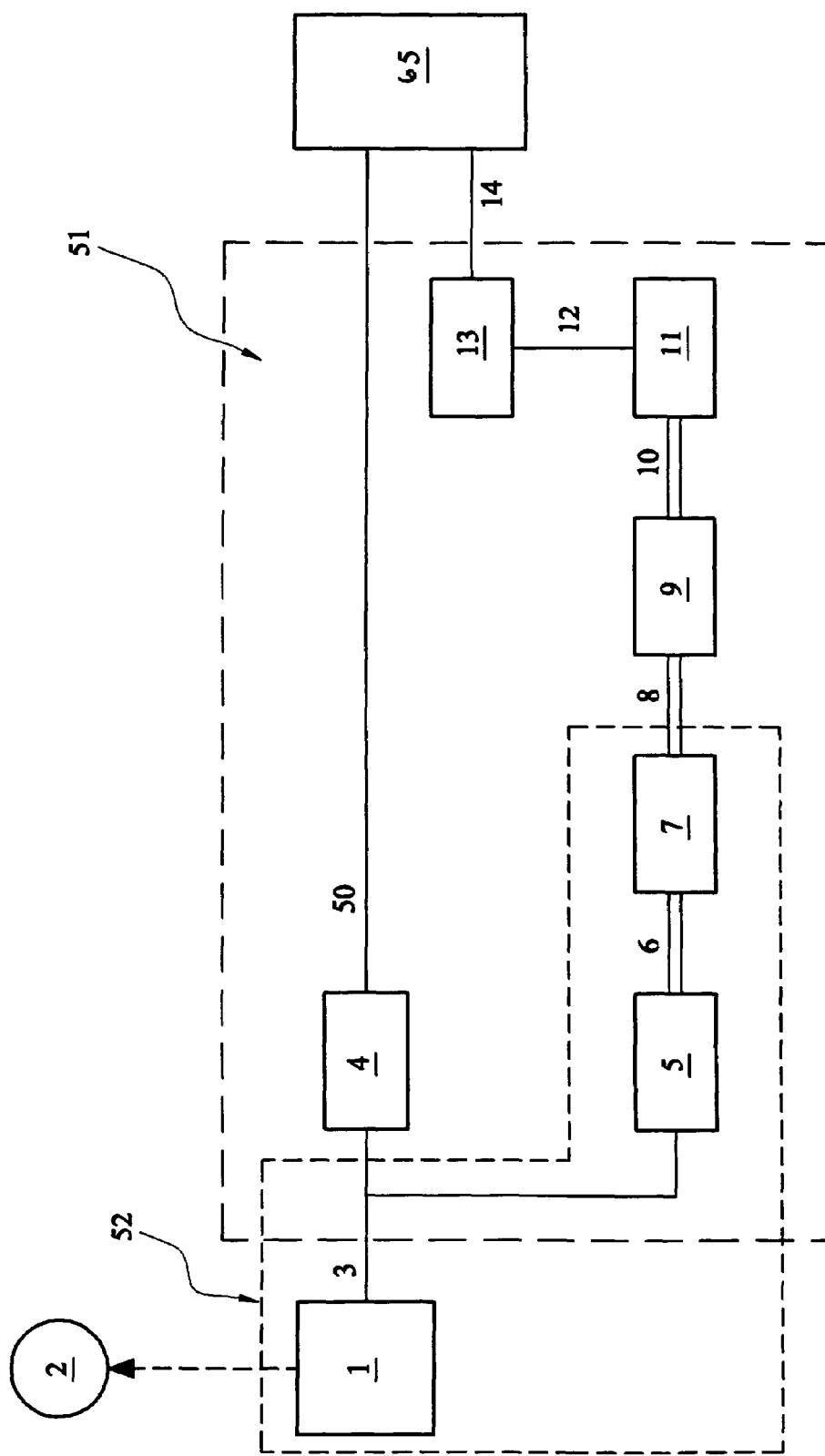
FIGS. 1 and 2 respectively illustrate schematically first and second embodiments of the invention.

Where practicable, similar elements in each of the embodiments have been given the same reference numeral. Any doubt should be resolved by the numeral assigned to the corresponding output signal.

The embodiment of FIG. 1 is arranged to detect when the wearer is gazing with overt interest at a feature. In contrast with later embodiments, it uses neither an eye direction detector nor a head movement sensing means. In this embodiment, with a head mounted camera 1 pointed in the wearer's normal horizontal viewing direction as indicated by the arrow, the gaze direction is taken as a first approximation to be centred in the video frame. The field of view of the camera substantially equates to that of the wearer.

If any slight dither in head direction is also ignored, an overt interest in a feature 2 will then manifest itself by the feature being centred in the video frames, and in this embodiment this is assumed to be the case irrespective of whether or not there is relative motion between the camera 1 and feature 2.

In FIG. 1, the video output 3 of camera 1 is coupled to a video signal processing circuit 51 where it is received both by a buffer or other delay 4 of n frames (nF) in length and an image analysis circuit 5. Circuit 5 acts on each video frame to identify features by optical segmentation of the video image, to locate the centres of such features, and to provide outputs 6 in the form of measurements of the distance d between the centre of each identified feature and the centre of the frame (the "reference position"). Each feature is tracked from frame to frame, but is removed from the chain once it disappears from the frame.

In this embodiment, the "centre" is defined as the "centre of gravity" of the feature as viewed in that frame (it may differ from frame to frame due for example to translation or rotation of the feature relative to the camera).

For each identified feature an algorithm circuit 7 applies an appropriate calculation to the measured signless distances d over a continuously moving time window of n frames, and in circuit 9 the set of outputs 8 one for each identified feature are thresholded to provide binary signals 10. Signals 10 are ORed together at 11 to provide a two-level or binary saliency signal 12 which is positive when at least one salient feature is present and zero otherwise.

Since the measurement takes n frames but the video signal 3 becomes relevant for saliency at the beginning of the window, a positive signal 12 is lengthened by nF in a logic circuit 13 to provide a modified saliency signal 14 which together with the buffered video signal 50 is coupled to a recorder 65, so that the start of signal 14 coincides with the start of the sequence of n frames which is indicated as being of high saliency.

It will be appreciated that this circuit is arranged so that the signal 14 can be of any length as determined by the length of the positive signal 12. Alternatively, it could be arranged so as to produce a pulse of a predetermined length and a predetermined timing with respect to the signal 12, e.g. commencing at the start of the n frames and being for example n frames long.

The circuit 7 may merely perform a simple running addition or averaging of d over the n frames, in which case the smaller the value of the result 8, the closer is feature 2 to the centre of the frame, and the more salient is the feature. However, preferably the saliency signal increases with saliency, so that circuit 5 is preferably further adapted, for example by subtracting the total value of d from a predetermined positive value. In either case, the threshold circuit 9 produces a positive signal only when the result is less than the set value.

In this arrangement it is possible that more than one feature can produce a positive signal 12 at any time. However, the circuit 7 may be adapted to perform more complex calculations to avoid this. For example, the values of d may be subjected to a non-linear transformation (e.g. by raising their values to a power, such as by squaring, or by converting them in a look-up table). In particular, with the emphasis on the frame centre, it may be desirable to increase large values of d by greater amounts than small values of d in such a transformation. An alternative approach may be to cancel the computation by circuit 7 for any feature once it strays too far from the frame centre during the time window.

In fact, an alternative manner of operation of circuit 7 may be merely to provide a binary saliency signal according to whether or not the value of d for a feature remains below a relatively small predetermined value during the time window.

Furthermore, d need not be measured in every frame. Where measured frames are spaced, the are preferably spaced regularly, e.g. once every two, three or four frames. Also, if appropriate, the head mounted camera may be replaced by only part thereof, including the imaging optics, with the rest of the camera mounted elsewhere on the wearer's body.

Figure 2:
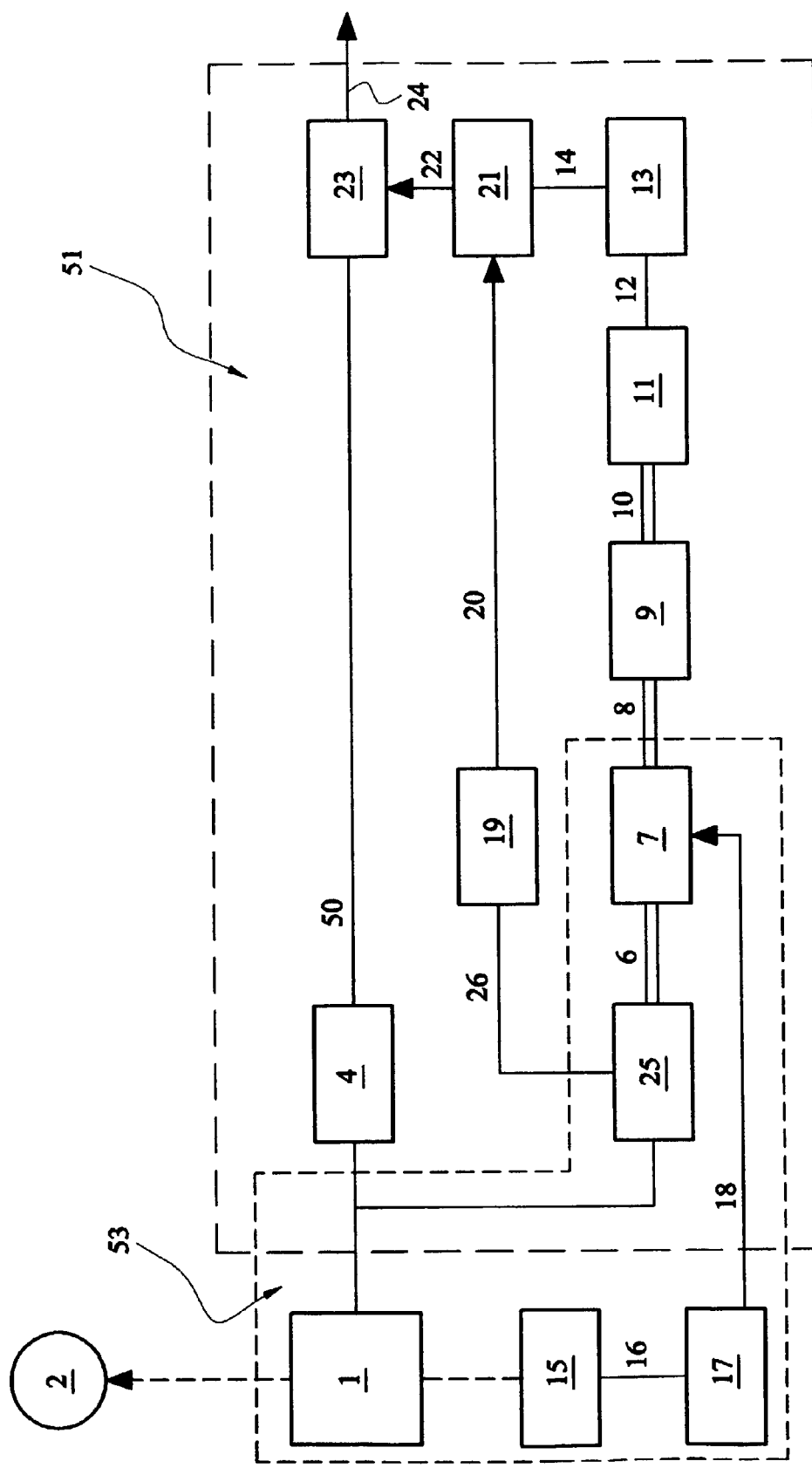

It would be expected that the saliency of the feature might be greater if head movement is occurring, since the wearer must then make a positive effort to follow a feature. Accordingly, FIG. 2 shows a modified version of FIG. 1 in which one or more gyros or accelerometers 15 (hereafter referred to broadly as accelerometers) arranged to measure rotation/translation are secured to the camera or imaging optics, to detect motion thereof, the output(s) 16 being thresholded 17 to provide a positive signal 18 if motion above a predetermined amount is occurring. Signal 18 provides a control input to circuit 7 to alter the computation performed thereby, for example by altering the type of computation and/or by altering the weightings applied to values of d according to whether or not motion is detected, or by altering the predetermined value of d used in providing a binary saliency output. Because the eye often follows movement faster than the head, the weightings may be adjusted to allow for more latitude in the value of d for a salient feature when relative movement is occurring.

In the embodiment of FIG. 2, an output 26 of the image analysis circuit 25 is coupled to a frame composition circuit 19 which acts on the feature information from circuit 25 to judge whether the composition of the frame is in accordance with a set of predetermined criteria, and provides a positive output 20 if this is the case. An AND circuit 21 receives both signals 14 and 20 to provide an output 22 which controls a gate 23 for selectively transmitting the delayed video signal 50. Thus, in this embodiment it is necessary for there to be a sufficient degree of composition and a sufficient saliency figure before the video frame is rated as satisfactory and interesting and is passed by the gate 23 as a selected signal 24 for storage and/or display. The accelerometers preferably provide a measure of rotation at the camera about one, two or three axes, although translation(s) can alternatively or additionally be measured.

It will be appreciated that the AND gate 21 may be replaced or supplemented by more complex logic for dealing with a variety of control inputs of which the saliency signal is but one. For example, a predetermined condition may be sensed which over-rules all other inputs, either for opening or closing the gate 23.

Preferably, for the same tracking of the feature 2 in the frames, it is arranged that the resulting signal 8 has a higher value if head or target motion is detected. In fact, where it is desired solely to identify the tracking of features by the camera wearer during head rotation for the generation of a positive saliency signal this can be done by appropriate setting of the computation performed by circuit 7, for example by arranging for the generation of a multiplier (or other function which increases the measured value with speed of head rotation, for example a binary function with a transition from zero to one when head rotation speed rises above a threshold), and which is zero or very small in the absence of any head rotation. In a particularly simple embodiment, targets may additionally only be considered to be significant if they remain within specified region of the frame area, normally an inner region and commonly centred at the frame centre, while tracking occurs due to target and/or camera movement.

Thus, as an example, the circuit of FIG. 2 may be arranged so that in the presence of a positive signal 18 the circuit 7 inspects the values d represented by signal 6 to determine whether or not an identified feature is in a specified sub-area of the frame, for example a circular inner area, and otherwise provides zero output. The binary value so obtained for any feature is then added over the time window, and the resulting signal 8 is thresholded at 9 so that only features which have remained in the specified sub-area above a predetermined fraction of the time window (as determined by threshold 9) provide a positive output 10.

Similarly, in a modification, measured eye movement of the wearer is used to adjust the region of the frame within which a feature needs to remain for generation of a saliency signal—in this case the multiplier or other function as set by circuit 7 may be a function (such as the multiplier or binary function mentioned above) of head rotation speed and/or eye rotation speed as desired. A head movement in which the eyes remain fixed upon a static target is strongly indicative of interest in the target, as is an eye movement for tracking a moving target when the head remains generally stationary. Thus in one preferred embodiment head rotation speed above a threshold and eye movement speed above a threshold are exclusively ORed to provide a binary function. However the two speeds may be combined in other ways, for example by simple or weighted addition, followed by thresholding.

Figure 9:
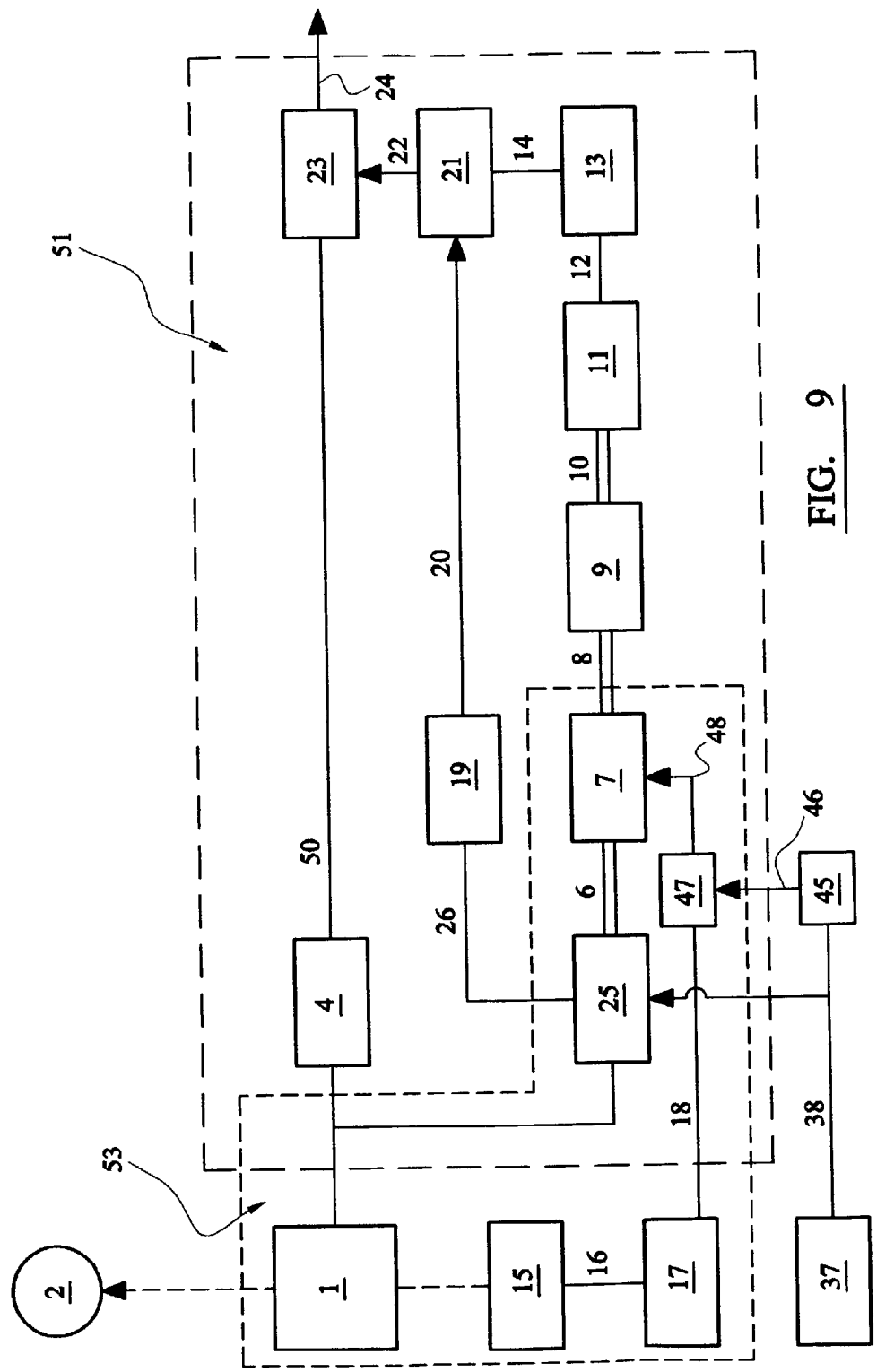
FIG. 9 schematically illustrates a modification of FIG. 2.

An example of this modification is shown in FIG. 9, which is generally similar to FIG. 2, but with differences in the lower left-hand corner. Here the output 38 of an eye direction detector 37 measuring deflection of eye direction from the normal straight-ahead gaze direction is input to the image analysis circuit 25 which adjusts the position of the specified sub-region prior to determining values whether recognised features are located therein. Preferably the adjustment is such that the sub-region maintains the same angular relation to the wearer's line of sight, normally so that the sub-region remains centred about the line of sight. The output 38 is also thresholded at 45 to provide a binary output 46 which is exclusively ORed at 47 with the binary output 18 of the threshold circuit 17 to provide a binary control signal 48. Signal 48 is passed to algorithm circuit 7 which is arranged to provide zero output when signal 48 is zero, and otherwise to sum the binary values 6 for each feature individually over the time window of the measurement. The individual sums 8 for each recognised feature are then passed to a further threshold circuit 9, etc., as before.

Thus the invention extends to automated camera apparatus comprising an electronic camera, the camera comprising a photoelectric sensor optically coupled to imaging optics for providing a video signal representative of sequential frames of an image viewed by the camera, and securing means for securing at least the imaging optics on the head of a wearer with its axis generally parallel to the normal forward line of sight of the wearer, the apparatus further comprising video signal processor arranged to receive said video signal for judging the degree of interest shown by the wearer in a feature in the scene and for providing a related saliency signal, the video signal processor including a video signal analyser for identifying the presence of at least one feature which remains within a predetermined (e.g. central) sub-region of the frame within each of a plurality of frames in a time window of the video signal, head movement sensor for sensing movement of the head of the wearer above a threshold level, and a movement analyser coupled to the outputs of said video signal analyser and the head movement sensor for providing a said saliency signal as a function of said outputs.

It also extends to automated camera apparatus comprising an electronic camera, the camera comprising a photoelectric sensor optically coupled to imaging optics for providing a video signal representative of sequential frames of an image viewed by the camera, and securing means for securing at least the imaging optics on the head of a wearer with its axis generally parallel to the normal forward line of sight of the wearer, the apparatus further comprising video signal processor arranged to receive said video signal for judging the degree of interest shown by the wearer in a feature in the scene and for providing a related saliency signal, the video signal processor including a video signal analyser for identifying the presence of at least one feature which remains within a specified sub-region of the frame within each of a plurality of frames in a time window of the video signal, eye direction measuring means for determining the direction of the eyes of the wearer relative to the said normal forward line of sight, the video signal analyser being coupled to the output of the eye direction measuring means for adjusting the position of the said sub-region in response thereto prior to identifying the presence of said feature(s) therein, and a movement analyser coupled to the outputs of said video signal analyser for providing a said saliency signal as a function of said outputs. The movement analyser may also be responsive to the output of the eye direction measuring means when producing the saliency signal. Preferably the apparatus also includes head movement sensor for sensing movement of the head of the wearer, and the movement responsive means is coupled to the output thereof (and optionally to the eye direction measuring means) for control of the production of the saliency signal.

Figure 3:
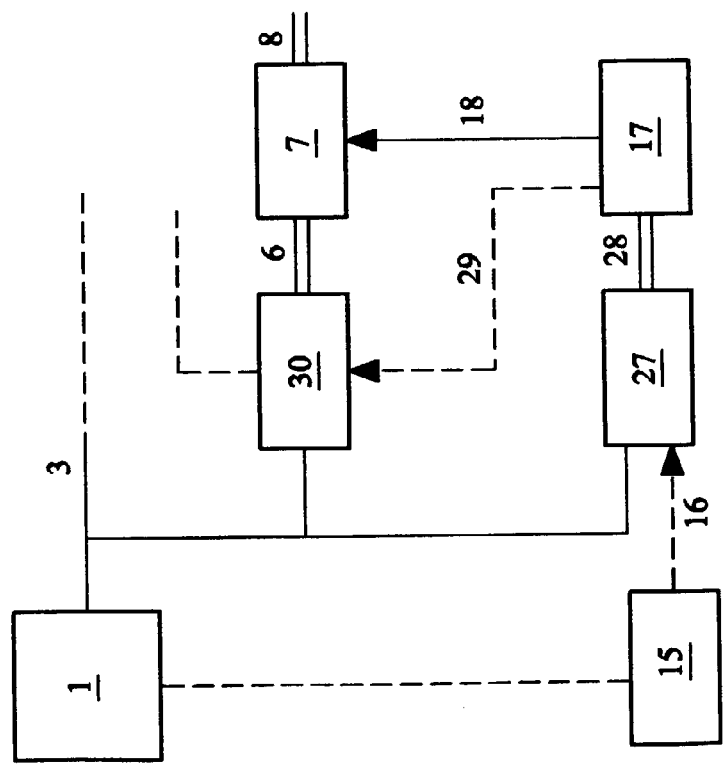

FIG. 3 shows a modification of the portion 52 of FIG. 1 or the portion 53 of FIG. 2. A circuit 27 is included for receiving the video signal 3 for measuring the background optic flow to give a measure 28 of camera movement which again is thresholded by circuit 17 for control of circuit 7 as described previously. However, the accelerometers 15 may be replaced by the circuit 27 or may optionally be retained to provide an input to circuit 27 to facilitate the interpretation of the optic flow patters, as shown in dotted lines.

As mentioned above, since the eyes often move faster than the head it is expected that while the eyes may truly track a moving feature the head movement will lag. Therefore this circuit also includes a further refinement in that the circuit 17 provides a speed output 29 which may or may not be identical to output 18, and the image analysis circuit 30 is adapted to receive the signal 29 and to adjust the position of the reference location accordingly, so that it is advanced in the direction of movement of the camera to approximate the faster eye movement. The measurement of d is thus given an asymmetry relative to the frame centre, to give greater saliency to a feature which leads the movement of the frame across the viewed scene. It should be clear that this feature could also occur in the embodiment of FIG. 2.

Figure 4:
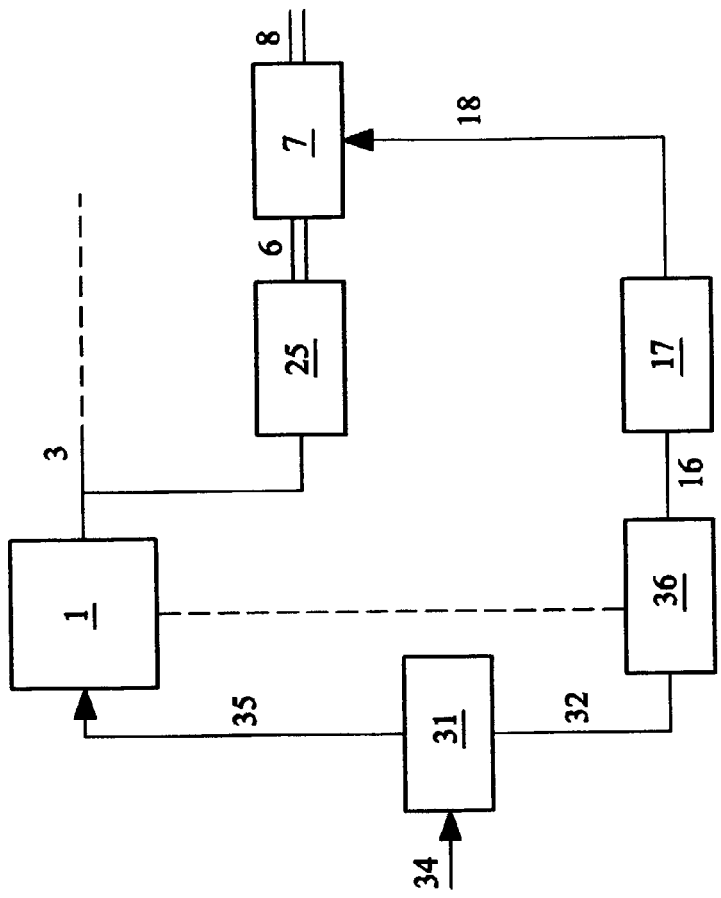
FIGS. 3 to 5 respectively schematically and partially show third to fifth and second embodiments of the invention.

FIG. 4 also shows a modification of the portion 52 of FIG. 1 or the portion 53 of FIG. 2 in which the camera has a significantly greater field of view than that of the wearer, but a scan control circuit 31 is adapted to control 35 the scanned area in the camera to provide a normal sized frame centred at an adjustable location (the reference position).

Circuit 31 has a manual input 34, e.g. a potentiometer, for adjusting the scan location during a setting up procedure so that the frame centre substantially coincides with the wearer's normal horizontal viewing direction. At least one accelerometer 36 is provided for detecting head movement, the output 16 of which is thresholded 17 and the output 18 applied to the algorithm circuit 7. Thus far this adaptation could also be applied to the embodiment of FIG. 3.

However, FIG. 4 is further adapted in that a second output(s) 32 of the accelerometer(s) 36 is coupled to the circuit 31 for causing a further adjustment of the scanned area when movement of the camera is detected, so as to displace the scanned area forwards in the direction of camera movement by an amount determined by the magnitude of signal 32. For example, if a large rate of clockwise rotation is detected at the camera the camera frame view is displaced to the right of the normal view to approximate more closely the expected eye direction.

In the embodiments of FIGS. 1 to 4, either no account is taken of eye movement relative to the head, or certain assumptions are made concerning this movement. However, it is preferable to be able to measure eye movement relative to the head and this is possible to effect using a head mounted eye monitor.

Figure 5:
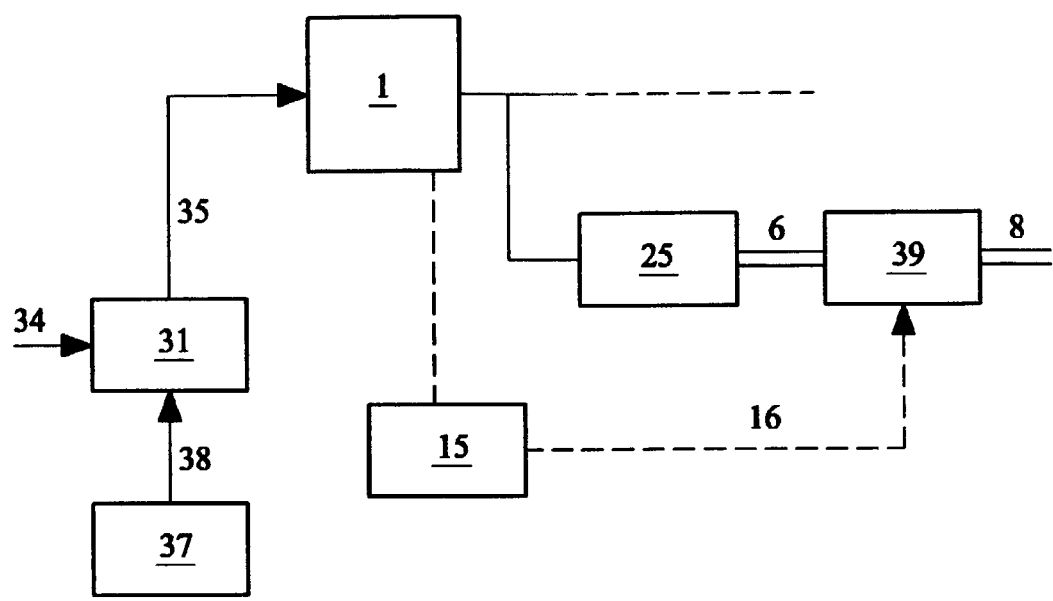

In FIG. 5 a head or camera mounted eye monitor 37 provides a signal 38 to the scan control circuit in lieu of the signal 32 so as to bring the reference position in the scanned frame into coincidence with the eye viewing direction. Accordingly in this embodiment, camera movement detection by accelerometers (15, as shown dotted) or optical flow (not shown) is optional, and need only control the circuit 7. While this optional part of arrangement may be similar to that shown in FIG. 2, as shown it is modified in that the thresholding circuit 17 is omitted and the weightings applied to the values of d are varied in a modified algorithm circuit 39 substantially continuously according to the value of the accelerometer output signal 16.

Figure 6:
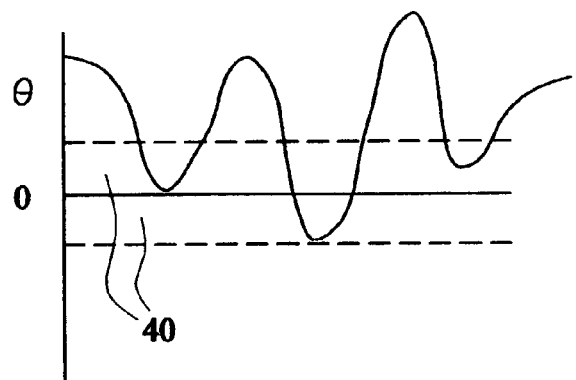
FIGS. 6 and 7 schematically illustrate two modes of repetitive glancing.
Figure 7:
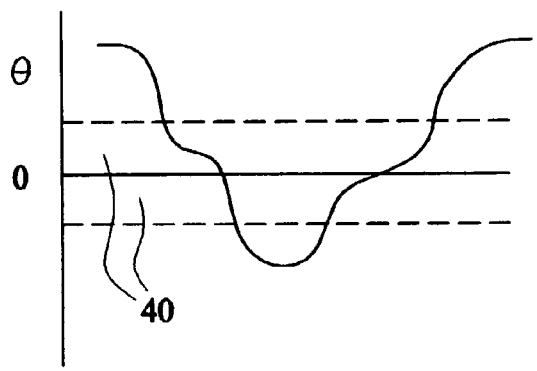

A person may not always wish to display an overt interest in a feature, for example when observing another person. FIGS. 6 and 7 schematically illustrate two modes of looking characterised by temporary glances rather than a continuous gaze, shown as plots of eye direction θ relative to a feature at θ=0, as a function of time T. The dashed lines delineate a region where the person may be regarded as looking at the feature.

In FIG. 6 the person may be supposed to be looking mainly in one direction, but occasionally glancing towards the feature and back again. Then plot is characterised by the repeated excursion from a finite value of θ to the region 40, and by a degree of hesitation in the glance direction within the region 40 during each excursion.

In FIG. 7 the plot is characterised by repeated passes through the region 40 and by a slowing down of the glance direction as it traverses the region 40.

Figure 8:
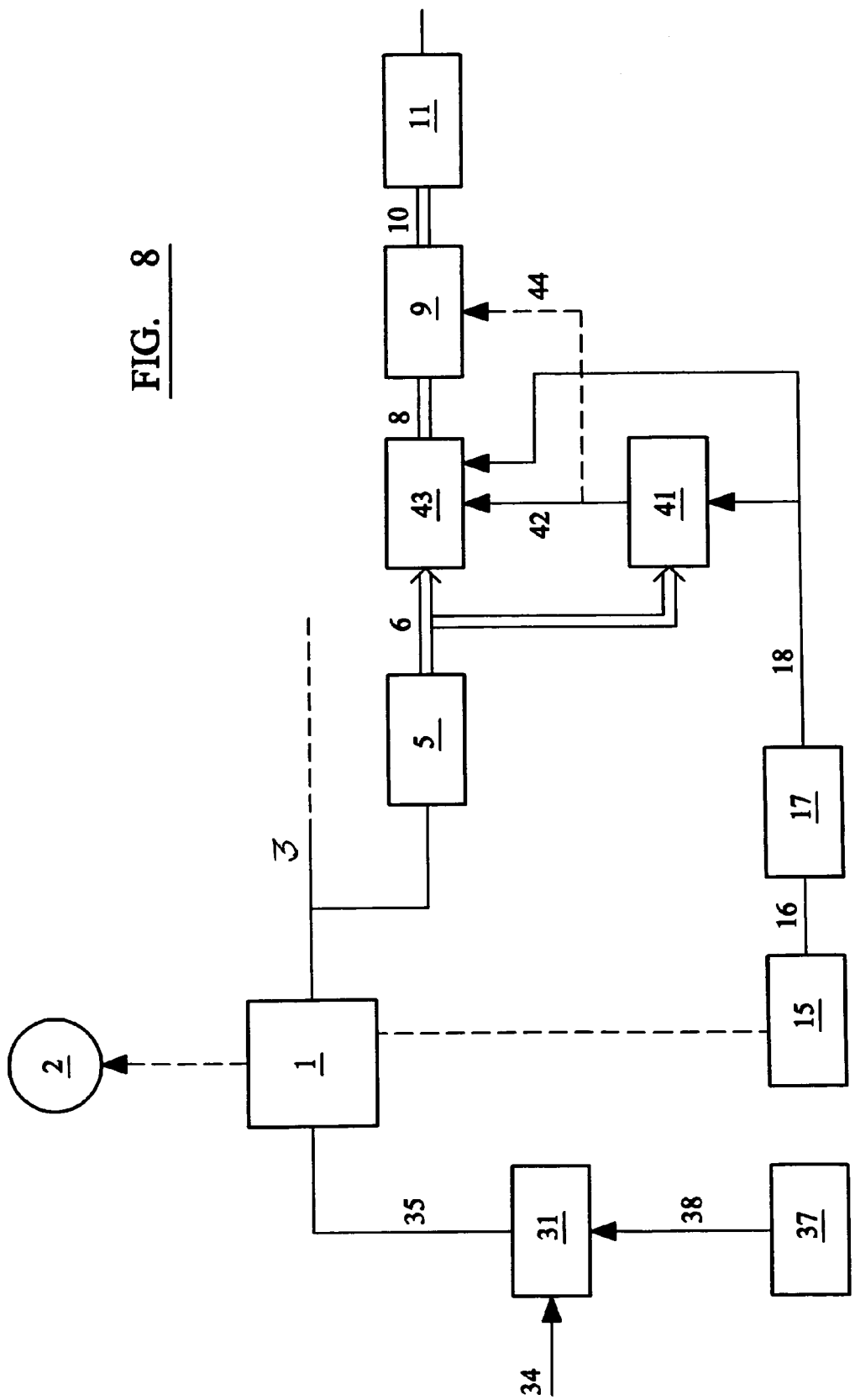
FIG. 8 schematically illustrates a sixth embodiment of the invention.

FIG. 8 schematically illustrates part of an embodiment in which the mode of looking is identified. As in FIG. 5, the output 38 of an eye direction sensor 37 is used to control the scan area within a camera 1 having a larger field of view than the wearer so that the frame centre coincides with the eye direction of the wearer. The video signal 3 is coupled to an image analysis circuit 5 which by optical segmentation identifies features within the frame and provides information 6 concerning the features, in particular their distances d relative to the frame centre (the reference position) to circuits 41 and 43. The output of one or more head mounted accelerometers 15 is also coupled to circuits 41 and 43 via a threshold circuit 17.

For each identified feature, circuit 41 acts to identify the type of looking which is occurring from:
(a) A substantially fixed gaze at a stationary feature (θ continuously within a region 40, and no substantial head motion as indicated by the output of circuit 17).
(b) A series of rapid glances as typified by FIG. 6.
(c) A series of rapid glances as typified by FIG. 7.
(d) An unclassified pattern.

The output 42 of circuit 41 (and optionally as shown the accelerometer output signal 18) is coupled to control the mode of operation of algorithm circuit 43. When looking mode (a) is detected, circuit 43 is controlled to operate as previously described with respect to any of the embodiments of FIGS. 1 to 4.

When mode (b) is detected, the circuit 43 is adapted to determine at least one of:
1. The number of times g during the time window of n frames the eye direction passes into and out of the region 40 (representative of the frequency of glancing); and
2. The number of frames h during which the eye direction is within the region 40 during each glance. The sum j of h over the window will give the total time for which the glance direction is in the region 40;

and to derive therefrom a measure of saliency as a continuous or a discrete value.

Either of g and j may be thresholded to provide a discrete saliency signal. In a variant a saliency measure is derived from h other than by simple addition or averaging—for example each value may be subjected to a non-linear transformation by computation (for example by squaring the values) or using a look-up table, so that longer glances are given disproportionately greater weights in a resulting summation representative of the saliency. In a further variant a computation is performed on g and h, or g and j, so that both the frequency of glancing and the duration of glancing are taken account of.

When mode (c) is detected, the circuit 43 acts similarly as for mode (b), but the parameters may be different.

When the saliency signal from the circuit 43 is a continuous value which is thresholded in a separate circuit 9, the threshold levels may be controlled by the output 42 of circuit 41 (as shown by dotted line 44) when providing a discrete saliency signal 10. In particular, when mode (d) is detected, circuit 9 may be controlled to pass a zero saliency signal.

In this embodiment, the length of the time window, i.e. the value of n, may be the same for all modes of looking, or it may be controlled so that each mode is associated with its own respective value of n.

The embodiment of FIG. 8 may be modified by providing separate circuits for the different modes and logically or otherwise combining the outputs to provide the saliency signal.

While the embodiments have been shown as employing circuits operative in real time, it should be understood that the video signal, and, where appropriate, other sensor outputs, may be stored for signal processing at a later stage. In such a case it is preferred to store the entire video signal even where the field of view of the camera is greater than that of the wearer.

Furthermore, the image analysis circuit may take the form of, or be supplemented by, an image recognition circuit. thereby adapting the arrangement for taking pictures of predetermined subjects.

Circuit arrangements of apparatus according to the invention may be under the control of an automatic learning control circuit, which can receive feedback from the wearer during training, for example in respect of modes of looking and/or acceptable pictures, and modify accordingly the action of the appropriate ones of the circuit blocks, for example the computation effected by the algorithm circuit, then levels of thresholds, or the action of the image analysis circuit.

Certain embodiments have been described which employ motion sensors such as gyros and/or accelerometers to detect head motion, the latter producing an alteration in the image viewed by the camera. It is possible to replace or supplement such sensors with other means for detecting an alteration in the scene viewed by the camera. For example the optic flow field may be derived and the pattern thereof analysed to determine the presence of rotation with or without translation. Thus in FIG. 2 the boxes 15 to 17 may be replaced by an arrangement coupled to receive the image signal from the camera and to derive and analyse the optic flow pattern, the resulting signal being coupled to the algorithm circuit 7 in lieu of the input 18 of FIG. 2.

The reader will appreciate that although the circuitry of embodiments has been schematically illustrated by the use of block diagrams representative of functional circuits, it is equally possible to practice the invention using a computer with the appropriate software.

The invention claimed is:

1. Automated camera apparatus comprising:
   an electronic camera, the camera comprising a photoelectric sensor optically coupled to imaging optics for providing a video signal representative of sequential frames of an image viewed by the camera, and at least the imaging optics being adapted for securing on the head of a wearer with its axis generally parallel to the normal forward line of sight of the wearer;
   a video signal processor arranged to receive said video signal for judging the degree of interest shown by the wearer in a feature in the scene and for providing a related saliency signal, the video signal processor including:
      a video signal analyser for identifying a presence of features and their respective locations in a frame within each of a plurality of frames in a time window of the video signal, and
      a movement analyser coupled to the output of said video signal analyser for analysing relative movement of at least one said feature over said plurality of frames to provide said saliency signal; and
   a video signal delay for delaying the video signal relative to the saliency signal.

2. Apparatus according to claim 1 wherein said plurality of frames is at least three frames.

3. Apparatus according to claim 1 wherein said video signal analyser comprises an image analyser for identifying said feature from a single frame.

4. Apparatus according to claim 3 wherein said plurality of frames is at least three frames.

5. Apparatus according to claim 4 wherein said movement analyser analyses the two dimensional track of said feature in the frame.

6. Apparatus according to claim 1 wherein the field of view of the camera is at least substantially equal to that of the wearer.

7. Apparatus according to claim 1 and including a head movement sensor for providing a measure of head movement of the wearer.

8. Apparatus according to claim 7 wherein said head movement sensor comprises at least one gyro or accelerometer.

9. Apparatus according to claim 7 wherein said head movement sensor is arranged to determine and analyse the optic flow in said series of frames.

10. Apparatus according to claim 7 wherein the video signal analyser identifies the location of said feature(s) relative to a reference position in the frame and the output of said head movement sensor is coupled to the camera or the video signal processor effectively to adjust said reference position.

11. Apparatus according to claim 7 wherein the output of said head movement sensor is coupled to the video signal processor to control the operation of the movement analyser.

12. Apparatus according to claim 1 further comprising an eye direction detector for determining the deflection of the eyes in the head relative to a standard position.

13. Apparatus according to claim 12 wherein the video signal analyser identifies the location of said feature(s) relative to a reference position in the frame and the output of said eye direction detector is coupled to the camera or the video signal processor effectively to adjust said reference position.

14. Apparatus according to claim 12 and comprising a scan controller for controlling the scan of the camera, wherein the scan controller is provided with a scan control input coupled to and responsive to said eye direction detection means to perform said effective adjustment of the reference position.

15. Apparatus according to claim 14 wherein said effective adjustment is performed by adjusting the scanned area of the camera so that the reference position is brought into substantial coincidence with the line of sight of the wearer.

16. Apparatus according to claim 1 wherein the field of view of the camera is greater than the field of view of the wearer.

17. Apparatus according to claim 16 and comprising a scan controller for controlling the scan of the camera.

18. Apparatus according to claim 17 and including a head movement sensor for providing a measure of head movement of the wearer, wherein the video signal analyser identifies the location of said feature(s) relative to a reference position in the frame, the output of said head movement sensor is coupled to the camera or the video signal processor effectively to adjust said reference position, and the scan controller is provided with a scan control input coupled to and responsive to the head movement sensor to perform said effective adjustment of the reference position.

19. Apparatus according to claim 17 wherein the scan controller is provided with an adjusting input for ensuring during setting up that the reference position in the video frames substantially coincides with the wearer's normal forward horizontal line of sight.

20. Apparatus according to claim 1 wherein the image analyser is adapted to identify features by optical segmentation and/or image recognition.

21. Apparatus according to claim 1, wherein the video signal processor is arranged to provide high or positive measure of saliency when a feature remains at or close to a single location in the series of frames.

22. Apparatus according to claim 1 wherein the video signal processor is arranged to function in real time.

23. Apparatus according to claim 22 and including a gate coupled to selectively gate the video signal for display or recording in response to the saliency signal.

24. Apparatus according to claim 1 further comprising a track analysis means that includes a threshold arrangement for providing a discretely varying saliency signal.

25. Apparatus according to claim 24 and including a time adjuster for altering the time of the transitions of said discretely varying threshold signal.

26. Automated camera apparatus comprising:
    an electronic camera, the camera comprising a photoelectric sensor optically coupled to imaging optics for providing a video signal representative of sequential frames of an image viewed by the camera, and at least the imaging optics being adapted for securing on the head of a wearer with its axis generally parallel to the normal forward line of sight of the wearer; and a video signal processor arranged to receive said video signal for judging the degree of interest shown by the wearer in a feature in the scene and for providing a related saliency signal, the video signal processor including:

a video signal analyser for identifying a presence of features and their respective locations in a frame within each of a plurality of the frames in a time window of the video signal, and a movement analyser coupled to the output of said video signal analyser for analysing relative movement of at least one said feature over said plurality of frames to provide said saliency signal, wherein the video signal processor is arranged to provide a high or positive measure of saliency when a feature moves relative to the reference location in a manner resembling a series of repeated glances.

27. Automated camera apparatus comprising:

an electronic camera, the camera comprising a photoelectric sensor optically coupled to imaging optics for providing a video signal representative of sequential frames of an image viewed by the camera, and at least the imaging optics being adapted for securing on the head of a wearer with its axis generally parallel to the normal forward line of sight of the wearer;

a video signal processor arranged to receive said video signal for judging the degree of interest shown by the wearer in a feature in the scene and for providing a related saliency signal, the video signal processor is arranged to function in real time, the video signal processor including:

a video signal analyser for identifying a presence of features and their respective locations in a frame within each of a plurality of the frames in a time window of the video signal, and a movement analyser coupled to the output of said video signal analyser for analysing relative movement of at least one said feature over said plurality of frames to provide said saliency signal; and a signal store for recording the saliency signal together with the video signal, wherein the video signal processor is arranged to function in real time.

28. Automated camera apparatus comprising:

an electronic camera, the camera comprising a photoelectric sensor optically coupled to imaging optics for providing a video signal representative of sequential frames of an image viewed by the camera, and at least the imaging optics being adapted for securing on the head of a wearer with its axis generally parallel to the normal forward line of sight of the wearer;

a video signal processor arranged to receive said video signal for judging the degree of interest shown by the wearer in a feature in the scene and for providing a related saliency signal, the video signal processor including:

a video signal analyser for identifying a presence of features and their respective locations in a frame within each of a plurality of the frames in a time window of the video signal, and a movement analyser coupled to the output of said video signal analyser for analysing relative movement of at least one said feature over said plurality of frames to provide said saliency signal; and means for recording the video signal together with any other signal necessary for determining the saliency signal, so that the saliency signal can be produced by the video signal processor at a later time.

29. Automated camera apparatus comprising:

an electronic camera, the camera comprising a photoelectric sensor optically coupled to imaging optics for providing a video signal representative of sequential frames of an image viewed by the camera, at least the imaging optics being adapted for securing on the head of a wearer with its axis generally parallel to the normal forward line of sight of the wearer;

a video signal processor arranged to receive said video signal for judging the degree of interest shown by the wearer in a feature in the scene and for providing a related saliency signal, the video signal processor including:

a video signal analyser for identifying a presence of at least one feature which remains within a predetermined sub-region of a frame within each of a plurality of the frames in a time window of the video signal, a head movement sensor for sensing movement of the head of the wearer above a threshold level, and a movement analyser coupled to the outputs of said video signal analyser and the head movement sensor for providing a said saliency signal as a function of said outputs; and a video signal delay for delaying the video signal relative to the saliency signal.

30. Apparatus according to claim 29 wherein the movement analyser is also responsive to the output of the eye direction measuring means when producing the saliency signal.

31. Apparatus according to claim 30 and further including a head movement sensor for sensing movement of the head of the wearer, and a movement responsive means coupled to the output thereof for control of the production of the saliency signal.

32. Apparatus according to claim 29 and further including a head movement sensor for sensing movement of the head of the wearer, and a movement responsive means coupled to the output thereof for control of the production of the saliency signal.

33. Automated camera apparatus comprising:

an electronic camera, the camera comprising a photoelectric sensor optically coupled to imaging optics for providing a video signal representative of sequential frames of an image viewed by the camera, at least the imaging optics being adapted for securing on the head of a wearer with its axis generally parallel to the normal forward line of sight of the wearer;

a video signal processor arranged to receive said video signal for judging the degree of interest shown by the wearer in a feature in the scene and for providing a related saliency signal, the video signal processor including:

a video signal analyser for identifying a presence of at least one feature which remains within a specified sub-region of a frame within each of a plurality of the frames in a time window of the video signal, eye direction measuring means for determining the direction of the eyes of the wearer relative to the said normal forward line of sight, the video signal analyser being coupled to the output of the eye direction measuring means for adjusting the position of the said sub-region in response thereto prior to identifying the presence of said feature(s) therein, and a movement analyser coupled to the outputs of said video signal analyser for providing a said saliency signal as a function of said outputs; and a video signal delay for delaying the video signal relative to the saliency signal.

34. Apparatus according to claim 33 and further including a head movement sensor for sensing movement of the head of the wearer, and a movement responsive means coupled to the output thereof for control of the production of the saliency signal.

35. A method of deriving a saliency signal which indicates the saliency of a feature to a wearer of a camera providing a video signal wherein at least the imaging optics of the camera are mounted on the wearer's head, the method comprising:

feature analyzing in which in a plurality of frames the video signal is analysed to identify at least one feature and its relative location within a frame area, pattern analyzing in which the pattern or manner of movement of the feature(s) within the frames over said plurality is analysed to derive a saliency signal corresponding to said at least one feature, and delaying the video signal relative to the saliency signal with a video signal delay.

36. A method according to claim 35 wherein said plurality of frames is at least three frames.

37. A method according to claim 35 wherein each single frame of said plurality is analysed for identifying said feature.

38. A method according to claim 37 wherein said plurality of frames is at least three frames.

39. A method according to claim 35 wherein said pattern analysis takes account of the two dimensional track of said feature in the frame.

40. A method according to claim 35 wherein the position within the frame area is measured with respect to a reference position which corresponds substantially with the wearer's normal horizontal line of sight.

41. A method according to claim 35 and further including obtaining a head movement signal indicative of movement of the head of the camera wearer.

42. A method according to claim 41 wherein said head movement signal is used to modify the scanning action of the camera.

43. A method according to claim 35 and including obtaining an eye movement signal indicative of eye movement of the wearer relative to the head.

44. A method according to claim 43 wherein said eye movement signal is used to modify the scanning action of the camera.

45. A method according to claim 35 wherein said saliency signal is derived in real time.

46. A method of deriving a saliency signal which indicates the saliency of a feature to a wearer of a camera providing a video signal wherein at least the imaging optics of the camera are mounted on the wearer's head, the method comprising:

feature analyzing in which in a plurality of frames the video signal is analyzed to identify at least one feature and its relative location within a frame area;

pattern analyzing in which the pattern or manner of movement of the feature(s) within the frames over said plurality is analysed to derive a saliency signal corresponding to said at least one feature; and obtaining a head movement signal indicative of movement of the head of the camera wearer, wherein said head movement signal is used to modify said pattern analysis step.

47. A method of deriving a saliency signal which indicates the saliency of a feature to a wearer of a camera providing a video signal wherein at least the imaging optics of the camera are mounted on the wearer's head, the method comprising:

feature analyzing in which in a plurality of frames the video signal is analyzed to identify at least one feature and its relative location within a frame area;

pattern analyzing in which the pattern or manner of movement of the feature(s) within the frames over said plurality is analysed to derive a saliency signal corresponding to said at least one feature; and obtaining an eye movement signal indicative of eye movement of the wearer relative to the head, wherein said eye movement signal is used to modify said pattern analysis step.

48. A method of deriving a saliency signal which indicates the saliency of a feature to a wearer of a camera providing a video signal wherein at least the imaging optics of the camera are mounted on the wearer's head, the method comprising:

feature analyzing in which in a plurality of frames the video signal is analyzed to identify at least one feature and its relative location within a frame area; and pattern analyzing in which the pattern or manner of movement of the feature(s) within the frames over said plurality is analysed to derive a saliency signal corresponding to said at least one feature, wherein said pattern analysis step includes classifying the movement of the feature according to a set of predetermined reference patterns and obtaining said saliency signal in a manner related to the classification of said pattern.

49. A method of deriving a saliency signal which indicates the saliency of a feature to a wearer of a camera providing a video signal wherein at least the imaging optics of the camera are mounted on the wearer's head, the method comprising:

feature analyzing in which in a plurality of frames the video signal is analyzed to identify at least one feature and its relative location within a frame area; and pattern analyzing in which the pattern or manner of movement of the feature(s) within the frames over said plurality is analysed to derive a saliency signal corresponding to said at least one feature, wherein said video signal is recorded prior to the obtaining of said saliency signal.

* * * * *